July 4, 1961  D. I. McDONALD  2,990,726
POWER TRANSMISSION UNIT
Filed Nov. 3, 1958  2 Sheets-Sheet 1

INVENTOR.
DAVID I. McDONALD
BY Tom Walker
ATTORNEY

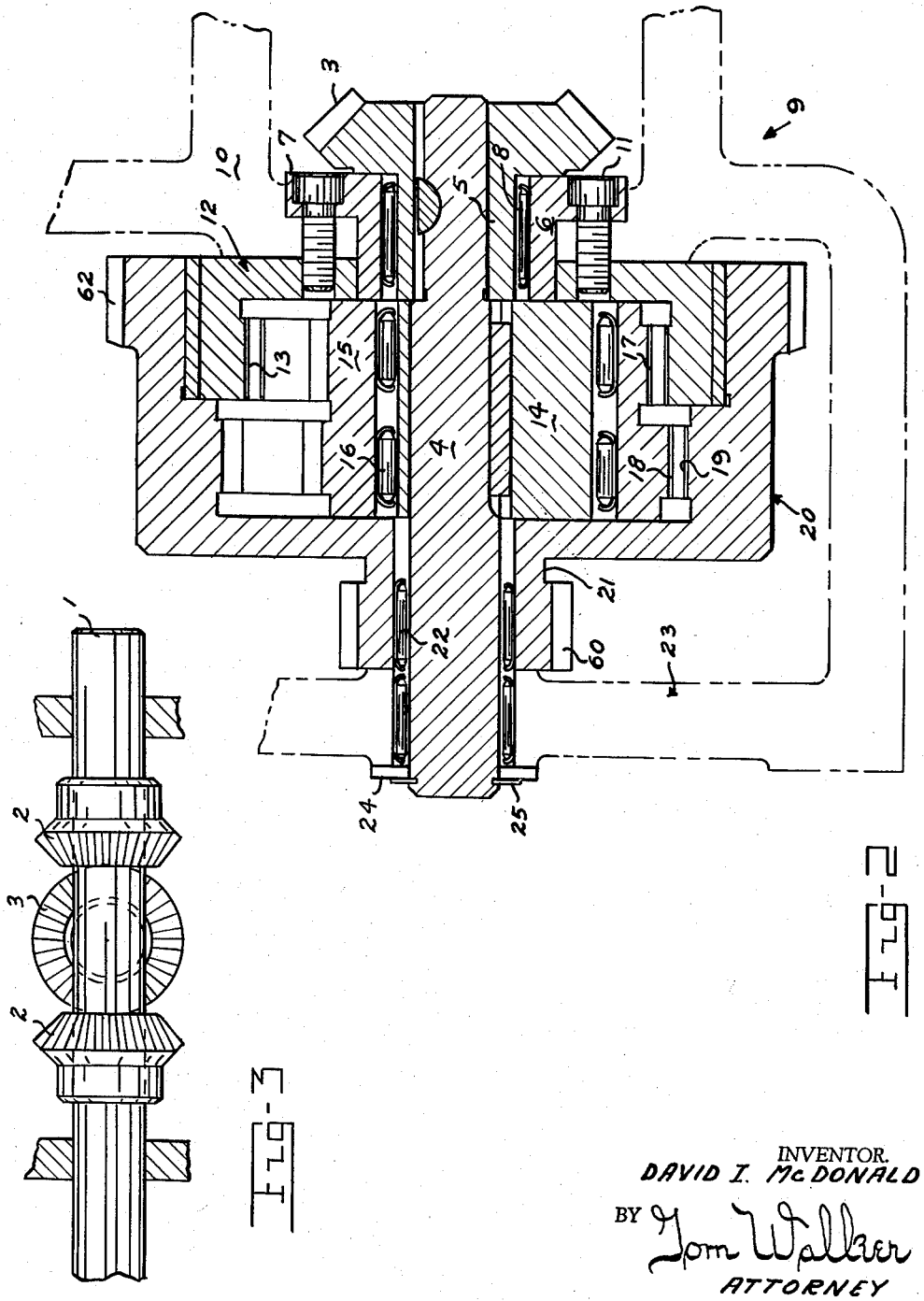

United States Patent Office 2,990,726
Patented July 4, 1961

2,990,726
POWER TRANSMISSION UNIT
David I. McDonald, Cincinnati, Ohio, assignor to Nebel Machine Tool Corporation, Cincinnati, Ohio, a corporation of Ohio
Filed Nov. 3, 1958, Ser. No. 771,572
7 Claims. (Cl. 74—740)

This invention relates to a power transmission system adapted to provide a variable selective feed range.

While the invention will be described herein in a limited form and application, it will be readily apparent to those versed in the art that the invention is not so limited nor is such intended.

The present invention effects improvements relative the prior art power transmission systems particularly advantageous in application to lathes and the like. It provides a totally integrated transmission with splash lubrication features and a feed system which may be readily adapted for selective direction and rate of drive. A further advance in the art is provided by the employment of a cartridge type unit which may be interchanged to provide a transmission system with a selective variable feed range. Also, the invention affords improvements relative prior art power transmission systems enabling a simplified dual feed arrangement for devices such as lathes.

A primary object of the invention is to provide improvements in transmission units affording a selective feed range thereto whereby such units may be economically fabricated, more efficient and satisfactory in use, adaptable to a wide variety of applications and simply applied and maintained.

A further object of the invention is to provide a simplified mechanism for effecting a dual feed range for lathes and the like.

Another object of the invention is to provide an improved power transmission system incorporating a cartridge type sub-assembly which may be readily interchanged to provide the system with a selective variable feed capacity.

An additional object of the invention is to provide means in the nature of a power transmission unit particularly adaptable to provide a dual feed range for lathes and the like which is variable in nature.

A further object of the invention is to provide a power transmission system possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention.

FIG. 2 is an enlarged view illustrating the interchangeable cartridge portion of the transmission unit of FIG. 1; and FIG. 3 is a detail view taken on lines 3—3 of FIG. 1.

Like parts are indicated by similar characters of reference throughout the several views.

Figure 1:
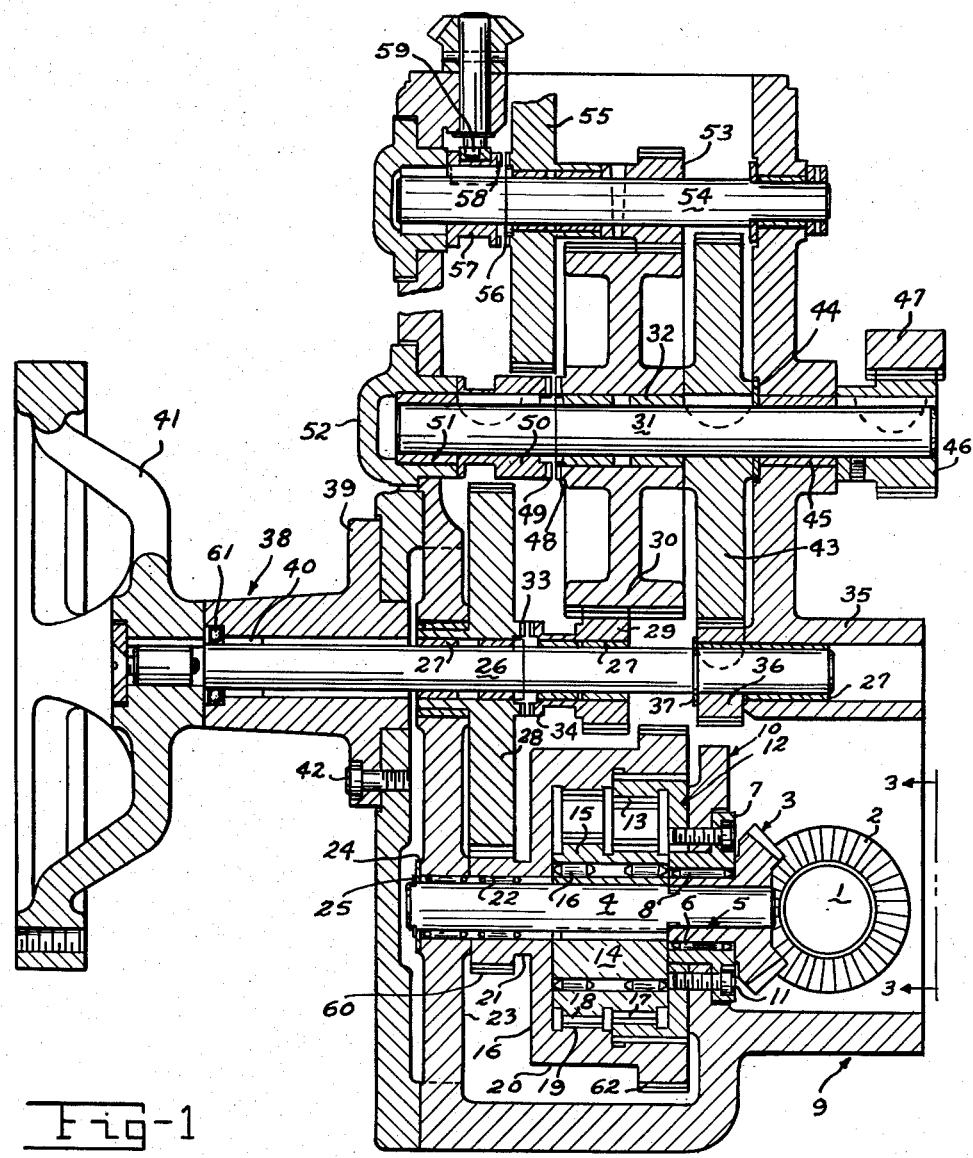
FIG. 1 is a cross-sectional view illustrating a power transmission unit in accordance with the invention.

Referring to FIGS. 1 and 3, a shaft 1 mounts a pair of bevel gears 2 in longitudinally spaced relation thereon. Gears 2 are selectively engageable, on axial movement of the shaft 1, to mesh with a bevel gear 3 keyed to one end of a transmission shaft 4. Gear 3 has a hub 5, an extremity of which extends inwardly of the shaft 4 to abut a shoulder provided by a radial expansion thereof.

A bushing 6 is disposed concentrically about the hub of gear 3. Bearings 8 between the hub 5 and bushing 6 enable free rotation of the gear 3 relative the bushing. An external flange to one end of the bushing abuts the inner face of gear 3 and seats in an annular recess in the outer surface of a wall 10 of the transmission housing 9. The other end of the bushing projects within housing 9 through wall 10. Bolts 11 extend through the external flange of the bushing 6 and wall 10 to engage and fix the base of a centrally apertured cup shaped element 12 in abutting relation to the inner surface of the wall 10 about the inner projecting extremity of the bushing 6. The cup element 12 is provided with an integrally formed internal gear 13 spaced beyond and concentric relative the inner end of the bushing 6.

A generally cylindrical block 14 is eccentrically mounted to shaft 4 and keyed thereto with one face in abutting relation to the inner extremity of the bushing 6 within the cup element 12. An annular sleeve 15 mounts about eccentric 14 by means of bearings 16 interposed therebetween. The sleeve 15 carries an integrally provided pair of longitudinally spaced spur pinions 17 and 18 externally thereof. The pinion 17 nests eccentrically within the cup element 12 in meshing engagement with the gear 13. The pinion 18 eccentrically nests in meshing engagement with an internal gear 19 integrally provided on the inner wall of a further cup shaped body 20 which is disposed oppositely relative the cup shaped element 12. The body 20 has an axially extended hub portion 21 integrally provided with an external pinion 60, supported on shaft 4 through the medium of bearings 22 therebetween. The hub 21 extends from the base of cup body 20 to abut an annular projection on a plate 23 parallel to the wall 10 of the housing 9. The cup body 20 is internally expanded in stepped fashion to its open end to provide an internal shoulder abutting the open extremity of the cup element 12, thereby effecting a seal therewith to provide a novel cartridge transmission section in accordance with the invention. The internally expanded open extremity of the cup 20 beyond this shoulder is concentrically disposed about the cup element 12 and is provided with an integrally formed external gear 62 which is substantially larger than pinion 60.

The extremity of the shaft 4 remote from the wall 10 extends through and is supported in plate 23 through the medium of bearings 22 thereabout. A ring washer 24 abuts the plate 23 about the projecting extremity of shaft 4. An annular recess in shaft 4 adjacent washer 24 receives a lock ring 25 which radially projects to engage the washer and prevent axial shifting of the shaft in a direction and manner believed obvious.

A shaft 26 extends through the housing 9 and wall 23 in parallel spaced relation to shaft 4. Cylindrical bearings 27 about the shaft 26 respectively mount a large gear 28 and an idler 29 in normal longitudinally spaced relation thereon for free rotation relative thereto. Gear 28 has a hub extension bearing in wall 23 between cylindrical bearings 27 concentrically related to the shaft 26. The gear 28 meshes with the pinion 60 integrally provided on the hub 21 of the cup 20. Idler 29 is normally spaced from gear 28 to its side away from the wall 23 and constantly meshes with a large gear 30 mounted to a shaft 31, parallel to shaft 26, through the medium of cylindrical bearings 32. The gear 30 is thus normally rotatable relative the shaft 31.

The gear 29 is provided with an axially projecting annularly recessed hub portion adjacent gear 28. The relatively adjacent faces of gear 28 and the hub of idler 29 have mating clutch elements 33 and 34 respectively. The hub of idler 29 is suitably connected to control means for axial adjustment thereof whereby the gears 28 and 29 may be selectively coupled or disposed in a normal spaced relation. The details of such control means are not illustrated since they are not essential to the presentation of the invention.

The shaft 26 further bears to one end in a bearing 27 in a cylindrically apertured wall portion 35 of the housing 9 remote from wall 23. The innermost surface of the wall portion 35 about the shaft 26 is formed to provide an annular projection. A pinion 36 keyed to the shaft 26 has one face in abutting and bearing relation to this projection on the wall portion 35. The shaft 26 is provided with an annular recess adjacent the other face of the pinion 36 receiving a lock ring 37 which radially projects to contain the pinion in a fixed position on the shaft 26 adjacent wall portion 35 of the housing 9.

The other end of the shaft 26 adjacent wall 23 projects outwardly through an aperture in housing 9 to concentrically mount within a generally cylindrical housing element 38 by means of a cylindrical bearing 40. The housing element 38 has an external flange 39 adjacent one end abutting the outer surface of the housing 9 as this end seats within the aperture through which the shaft 26 projects. The outermost end of the housing element 38 is internally expanded to receive a ball bearing 61 which is thereby disposed about the shaft 26. A hand wheel 41 about the projecting extremity of the shaft 26 is suitably fixed thereto in a conventional manner believed obvious from FIG. 1 of the drawings. Bolts 42 fix the flange 39 to the housing 9. Thus, hand wheel 41 may be operated to turn the shaft 26 and drive the pinion 36 thereby.

Pinion 36 meshes with a large spur gear 43 fixed to shaft 31. The gear 43 has a hub with one face in bearing abutment to the gear 30 while its other face bears on a ring 44 seated in a recess in the adjacent wall of housing 9 through which the shaft 31 projects. A cylindrical bearing 45 is provided about the shaft 31 in the wall of housing 9. The projecting extremity of the shaft 31 has an output pinion 46 fixed thereto for engagement with a rack 47 or the like as and for purposes to be described.

The face of the hub of gear 30 remote from gear 43 has a suitable coupling device 48 opposite a mating coupling device 49 on a normally spaced sleeve 50 keyed for rotation with but arranged for axial adjustment on shaft 31. Sleeve 50 has suitable means provided for axial movement thereof to selectively couple with gear 30 as will be described. The end of shaft 31 remote from the pinion 46 is supported in a bearing 51 in a cap 52 closing an aperture in the wall of housing 9. The cap 52 forms a limit for movement of sleeve 50 away from gear 30.

The gear 30 meshes with a gear 53 fixed for rotation with a shaft 54 parallel to the shaft 31. Gear 53 has an axially projecting hub bearing against the axially projected hub of a large gear 55 mounted for rotation relative shaft 54. The hub of gear 55 has a coupling device 56 normally spaced from a mating clutch device 58 on a collar 57 keyed for adjustment axially of the shaft 54. An eccentric drive means 59 of a suitable nature is provided for axial adjustment of the collar 57, engaging in an annular recess centrally thereof to operate the collar in a manner believed obvious.

A power transmission system is thus provided in accordance with the invention. It is believed that the invention will be clarified by the following description of selective operations thereof. The system is actuated through the medium of one or the other of the bevel gears 2 on the shaft 1. As will be obvious the shaft 1 may be axially adjusted to selectively engage a bevel gear 2 to the bevel gear 3 on the shaft 4. The direction of drive of the shaft 4 is of course dependent on which of the bevel gears 2 is engaged to the gear 3. The drive of the shaft 4 causes the eccentric body 14 to rotate therewith. The eccentric carries and drives sleeve 15 and the two spur pinions 17 and 18, which will have different numbers of teeth, through the medium of bearings 16. Since body 14 it eccentric relative the shaft 4, so are the gears 17 and 18. The pinion 17 is in meshing engagement with the internal gear 13 which is fixed while the pinion 18 is in meshing engagement with the internal gear 19 and drives the cup element 20 thereby. It should be noted that although the sleeve 15 carrying the gears 17 and 18 is supported on the eccentric 14 merely by means of the bearings 16, the eccentric nature of the body 14 induces a movement of sleeve 15 therewith in a particular relation thereto governed by the nature of pinion 17 and gear 13. The functional unit just described, encompassed by cap elements 12 and 20, constitutes the cartridge transmission unit as provided by the invention. From this point the drive may be directed in one of two paths dependent on the nature of the transmission desired. One gear train from element 20 has a different ratio than the other making it obvious that selective feed may be made from this point. As illustrated, the feed take off will be from the pinion 60 or gear 62.

To provide a high feed range, for example, the pinion 29, which is an idler, may be suitably shifted axially of the shaft 26 to mesh with large gear 62 externally of the cup element 20 at its open end. The mesh of idler 29 and gear 30 is maintained. This provides a drive from gear 18, through gear 19 to gear 62, through idler 29 into the gear 30. The sleeve 50 is suitably clutched to the gear 30 and, since the sleeve 50 is keyed to the shaft 31, the shaft 31 is thereby driven to drive the output pinion 46. In the instance of application to lathes, the pinion 46 may impart motion to a carriage on the lathe bed by meshing engagement to a rack 47. The illustrative embodiment being particularly adaptable to lathes further provides for relative cross-feed by drive from the gear 30 through the gear 53 into shaft 54. By suitable adjustment of the clutch collar 57 through the medium of the control 59, the gear 55 may be driven through the clutch collar to effect the necessary feed of the cross slide of the lathe by a transfer through the gear 55 and suitable idlers to a cross-feed screw.

To provide fine feed by means of the illustrative embodiment of the invention, the idler 29 is clutched through the medium of elements 33 and 34 to the gear 28 and the drive is then from the pinion 60 on the hub 21 of the cup element 20 through the gear 28. The gear 28 is clutched through the idler 29 to the gear 30 and thereby to gear 53 and cross-feed may be effected as previously described. Moreover, the gear 28 drives through the gear 30, on clutching of sleeve 50 thereto, through the shaft 31 to the pinion 46 as previously described. Thus, selective feed is simply provided.

By the provision of the particular compact cartridge transmission section completely enclosed by cup elements 12 and 20, a variable feed may selectively and efficiently be imparted through the medium of pinion 60 or gear 62 integrally provided on the cup element 20. By the mere interchange of the cartridge which can be readily effected in the transmission system, to provide one with different gearing between pinion 18 and gear 19 for example a different selective feed may be provided in the system, which thereby has a capacity for variable selective feed. The handwheel 4 provides a manual control for pinion 46 in the event it should be necessary.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the stature the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Feed transmission apparatus including drive means, an eccentric body connected to said drive means and driven thereby, a sleeve bearing on said body and driven therethrough, gear means on said sleeve, means controlling the movement of said sleeve with said body through one of said gear means, a transmission element in containing relation to said sleeve forming a relatively sealed transmission cartridge with said control means and driven through other of said gear means, said transmission element having portions spaced longitudinally thereof providing gear means of different size, feed drive means adapted for selective coupling to said longitudinally spaced portions of said transmission element and coupling means for selectively coupling said gear means on said transmission element to said feed drive means.

2. Power transmission apparatus, including a frame, driving, intermediate and driven shafts mounted in said frame, a speed reduction unit operatively connected to said driving shaft and providing a rotatable housing having a pair of longitudinally spaced external gears thereon, a spur gear rotatable on said intermediate shaft and continuously meshing with one of said pair of external gears, an idler gear rotatable on said intermediate shaft and longitudinally shiftable alternatively to be coupled to said spur gear for rotation thereby or to be meshed with the other one of said pair of external gears, and means communicating the rotation of said idler gear to said driven shaft.

3. A power transmission apparatus according to claim 2, characterized by manual means operable through said intermediate shaft for rotating said driven shaft.

4. Power transmission apparatus, including a frame, driving intermediate and driven shafts mounted in said frame, a speed reduction unit operatively connected to said drive shaft and providing a rotatable housing having a pair of longitudinally spaced external gears thereon, a spur gear rotatable on said intermediate shaft and continuously meshing with one of said pair of external gears, an idler gear rotatable on said intermediate shaft and longitudinally shiftable alternatively to be coupled to said spur gear for rotation thereby or to be meshed with the other one of said pair of external gears, and gear means on said driven shaft continuously meshing with said idler gear.

5. Power transmission means according to claim 4, characterized by means selectively coupling said gear means to said driven shaft in driving relation thereto.

6. Power transmission apparatus, including a frame, driving, intermediate and driven shafts mounted in said frame, a speed reduction unit operatively connected to said drive shaft and providing a rotatable housing having a pair of longitudinally spaced external gears thereon, said gears being of different diameter, a large spur gear rotatably mounted on said intermediate gear and continuously meshing with the smaller one of said external gears, an idler gear rotatable on said intermediate shaft and longitudinally shiftable thereon, clutch means between said larger spur gear and said idler gear engaged by longitudinal shifting motion of said idler gear in one direction and disengaged by like motion of said idler in the opposite direction, said idler gear being movable into meshing engagement with the larger one of said external gears in response to longitudinal motion thereof in said opposite direction and moving out of such meshing engagement upon like motion in said one direction, and means communicating the rotation of said idler gear in any longitudinal position of adjustment to said driven shaft.

7. Power transmission apparatus, including a frame having a pair of upstanding spaced apart side walls, a drive sleeve rotatably mounted in one of said side walls, a drive shaft having a bearing at its one end in the other one of said side walls and being received at its other end in driven relationship thereto within said sleeve, a pair of interfitting housing elements between said walls in surrounding relation to said shaft, the inner one of said elements being fixed to said frame and the outer one being rotatably mounted on said shaft, said outer housing having external gears of different diameter thereon, and a planetary gear drive having common communication with said shaft and said inner and outer housing elements contained within said interfitting housing elements and rotating said outer housing element at a relatively reduced speed.

References Cited in the file of this patent

UNITED STATES PATENTS

| | | |
|---|---|---|
| 607,816 | Allen | July 26, 1898 |
| 880,179 | Tripp | Feb. 25, 1908 |
| 1,192,627 | Hatlee | July 25, 1916 |
| 1,537,969 | Snyder | May 19, 1925 |
| 1,873,380 | Gibson | Aug. 23, 1932 |
| 2,180,154 | Lenz | Nov. 14, 1939 |

FOREIGN PATENTS

| | | |
|---|---|---|
| 739,276 | Germany | Sept. 17, 1943 |
| 418,342 | Italy | Feb. 15, 1947 |
| 248,593 | Switzerland | Feb. 16, 1948 |
| 437,947 | Italy | July 20, 1948 |
| 459,600 | Canada | Sept. 13, 1949 |
| 826,397 | Germany | Jan. 3, 1952 |
| 533,200 | Belgium | Mar. 28, 1958 |